3,064,031
PROCESS FOR PREPARING DIALKYL ALKYL PHOSPHONATES

Roger E. Zimmerer, Springfield Township, Hamilton County, Ohio, assignor to The Procter & Gamble Company, Cincinnati, Ohio, a corporation of Ohio
No Drawing. Filed Feb. 5, 1962, Ser. No. 171,298
2 Claims. (Cl. 260—461)

This invention relates to the preparation of dialkyl alkylphosphonates from dialkyl phosphites.

Dialkyl alkylphosphonates are valuable intermediate compounds and have been heretofore prepared in reactions using alkyl halides which are expensive and result in halide by-products. It is an object of the present invention to provide a novel process for preparing dialkyl alkyl phosphonates which is conducted without difficulty and results in high yields.

The process of this invention is the reaction of about one mole of an alkali metal with about two moles of dialkyl phosphite to form dialkyl alkylphosphonate and alkali metal monoalkyl phosphite. The latter compound is a solid and can be removed from the phosphonate, for example, by filtration.

The reaction of this invention is more fully described by the following equation:

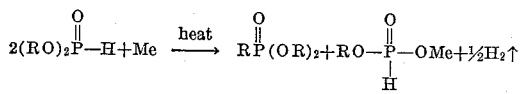

R is a primary alkyl group, straight or branched chain, ranging from 2 to about 20 carbon atoms and Me is an alkali metal, e.g., sodium, potassium, lithium, rubidium or cesium. The reaction can be conducted as set forth above, i.e., reacting one mole of alkali metal with two moles of dialkyl phosphite, or the reaction can be in the following form: (R and Me as above):

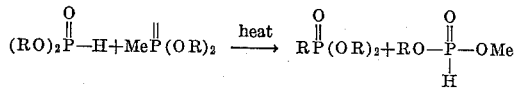

wherein the

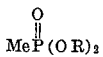

has previously been prepared by reacting molar equivalents of alkali metal and dialkyl phosphite.

The reaction is conducted with heat, the reaction temperature being in the range of about 50° C. to about 200° C. The reaction usually requires from about 2 to about 20 hours. The reactants can be heated alone or, preferably, in the presence of an inert hydrocarbon solvent, e.g., heptane, toluene or cymene. After removal of the solid alkali metal monoalkyl phosphite from the reaction mixture, the solvent can be removed from the phosphonate by distillation. When the dialkyl phosphites used in the reaction are lower molecular weight, the dialkyl alkylphosphonates can be purified by distillation if desired. The preferred alkali metal in the reaction is sodium. Preferably the reaction is carried on under anhydrous conditions.

The process of this invention can be practiced employing primary dialkyl phosphites wherein the alkyl groups are straight or branched chain alkyls. Dialkyl alkylphosphonates are not produced if secondary or tertiary dialkyl phosphites are used.

The dialkyl phosphite starting materials used in the process of this invention can be prepared by reacting primary alcohols with phosphorous halides such as phosphorous trichloride: (Ref. G. M. Kosolapoff, Organophorphorus Compounds, John Wiley and Sons, N.Y., 1950, pp. 180–184).

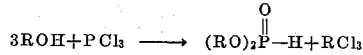

(wherein R is as above).

The process of this invention is illustrated by the following examples but is not limited thereto.

Example I 1.2 grams of sodium (0.05 mole) was added to 250 ml. of dry heptane in a 500 ml. boiling flask under a reflux condenser protected by a drying tube. 19.4 grams of dibutyl phosphite (0.1 mole) was added to the sodium and heptane and the mixture was brought rapidly to reflux (a temperature of about 99° C.). The sodium was consumed in several minutes and within 15 minutes a slight turbidity was noted which increased with time. After 17 hours the mixture was cooled and the solids in the mixture were removed by vacuum filtration, washed with heptane and dried in vacuo to yield 7.7 grams (96% yield) of sodium monobutyl phosphite. This salt was dissolved in a water-alcohol mixture and precipitated by adding acetone, then dried in vacuo. Analysis: calculated for $C_4H_{10}O_3PNa$: P, 19.4%; Na, 14.4%. Found: P, 19.3%; Na, 15.0%. The heptane was removed from the filtrate by distillation through a one foot Vigreux column. The residue, 9.1 grams, was distilled through a semi-micro still to yield 6.1 grams (49% yield) of dibutyl butylphosphonate, B.P.$_{3.0}$ 122–24° C., $n_D^{25}$ —1.4299; literature [1] B.P.$_{10}$ 150–51° C., $n_D^{25}$ —1.4302.

---
[1] G. M. Kosolapoff: "Organophosphorous Compounds," John Wiley & Sons, New York (1950), page 150.

*Analysis.*—Calculated for $C_{12}H_{27}O_3P$: C, 57.1%; H, 10.8%; P, 12.3%. Found: C, 57.0%; H, 10.5%; P, 12.0%.

Results analogous to those in Example I can be obtained using molar equivalent amounts of potassium, lithium or cesium to form dibutyl butyl phosphonate and the respective alkali metal monobutyl phosphite. Analogous results can also be obtained using molar equivalent amounts of diethyl phosphite, dipropyl phosphite, dihexyl phosphite, dioctyl phosphite or di(4-methylpentyl) phosphite to form the respective dialkyl alkyl phosphonate and sodium monoalkyl phosphite.

Example II 65 grams of sodium dibutyl phosphite (0.3 mole) were dissolved in 116.5 grams of dibutyl phosphite (0.6 mole) by a drying tube. (0.3 molar excess of dibutyl phosphite acted as a solvent for the reaction.) The temperature was raised rapidly to 120° C. with an oil bath for temperature control. The solution was stirred with a magnetic stirrer. Within an hour substantial crystallization had taken place. The reaction was continued for two additional hours, cooled, mixed with 500 ml. of water, and extracted three times with 500 ml. portions of diethyl ether. The aqueous portion was freeze-dried to give 42 grams (88% yield) of sodium monobutyl phosphite. The combined ether solution was dried over $CaSO_4$, filtered, and the ether removed by distillation through a one foot Vigreux column leaving 115 grams of residual phosphorous esters. On infrared and nuclear magnetic resonance spectral analysis, the composition was calculated to contain 68% dibutyl phosphite, 27% dibutyl butylphosphonate and 5% unidentified phosphate. This represents a 49% yield of phosphonate (based on 0.3 mole theoretical yield). The yield would have been better if an inert solvent (as in Example I) had been used to achieve more efficient mixing.

Example III 84 grams of didodecyl phosphite (0.2 mole) was reacted with 2.3 grams of sodium (0.1 mole) in a manner analogous to Example I. The solid sodium monododecyl phosphite was removed by vacuum filtration, washed with heptane and air dried to obtain 27 grams (100% yield).

*Analysis.*—Calculated for $C_{12}H_{26}O_3PNa$: P, 11.4%. Found: P, 10.9%.

The heptane filtrate was washed with water and stripped of solvent under vacuum to yield 55 grams (94% yield) didodecyl dodecylphosphonate.

*Analysis.* — Calculated for $C_{36}H_{75}O_3P$: P, 5.28%. Found: P, 4.97%.

Results analogous to those in Example III can be obtained using molar equivalent amounts of didecyl phosphite, dihexadecylphosphite, dioctadecyl phosphite or di-(11-methyl dodecyl) phosphite to form the respective dialkyl alkyl phosphonate and sodium monoalkyl phosphite.

Dialkyl alkylphosphonates have been suggested as useful as plasticizers, synthetic lubricants and additives to improve extreme-pressure properties. Some dialkyl alkylphosphonates have been suggested as flame retardants, softeners, textile treating agents and heat transfer media.

The dialkyl alkylphosphonates formed by the process of this invention are useful intermediates leading to corrosion inhibitors such as those described in U.S. Patent 2,224,695. Also the dialkyl alkylphosphonate can be hydrolyzed with hydrochloric or hydrobromic acid to form an alkyl phosphonic acid which is useful as an inhibitor of the corrosion of aluminum or German silver in aqueous alkaline systems. For example:

$$R\overset{O}{\underset{\parallel}{P}}(OR)_2 + 2HCl \longrightarrow R\overset{O}{\underset{\parallel}{P}}(OH)_2 + 2RCl$$

Such alkyl phosphonic acids and their salts are useful as stabilizers for soap (see U.S. Patent 2,765,279) and for hydrocarbon oils (see U.S. Patent 2,346,154).

What is claimed is:

1. The process of reacting about one mole of dialkyl phosphite with about one mole of alkali metal dialkyl phosphite at a temperature of about 50° C. to about 200° C. to form dialkyl alkyl phosphonate and alkali metal monoalkylphosphite, the alkyl being selected from the group consisting of primary straight and branched chain alkyl groups ranging in chain length from two to about 20 carbon atoms.

2. The process of claim 1 wherein the alkali metal is sodium, the alkyl is a straight chain alkyl, the reaction is conducted in an inert hydrocarbon solvent and the reaction products are separated from each other.

References Cited in the file of this patent

UNITED STATES PATENTS

| | | |
|---|---|---|
| 2,784,208 | Ries | Mar. 5, 1957 |
| 2,843,616 | Hardy et al. | July 15, 1958 |
| 2,863,900 | Beach et al. | Dec. 9, 1958 |
| 2,908,708 | Beach | Oct. 13, 1959 |
| 2,908,709 | Beach | Oct. 13, 1959 |
| 2,951,863 | Dawson et al. | Sept. 6, 1960 |